(12) United States Patent
Takahashi et al.

(10) Patent No.: US 12,238,694 B2
(45) Date of Patent: Feb. 25, 2025

(54) USER APPARATUS AND BASE STATION APPARATUS

(71) Applicant: NTT DOCOMO, INC., Tokyo (JP)

(72) Inventors: Hideaki Takahashi, Tokyo (JP); Yousuke Sano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 470 days.

(21) Appl. No.: 17/429,480

(22) PCT Filed: Feb. 22, 2019

(86) PCT No.: PCT/JP2019/006884
§ 371 (c)(1),
(2) Date: Aug. 9, 2021

(87) PCT Pub. No.: WO2020/170445
PCT Pub. Date: Aug. 27, 2020

(65) Prior Publication Data
US 2022/0110121 A1    Apr. 7, 2022

(51) Int. Cl.
*H04W 72/0453*      (2023.01)

(52) U.S. Cl.
CPC .............................. *H04W 72/0453* (2013.01)

(58) Field of Classification Search
CPC ............ H04W 72/0453; H04W 72/04; H04W 72/0446; H04W 72/0493; H04W 72/53; H04W 72/542; H04W 72/23; H04W 72/048; H04W 72/51; H04W 72/085; H04W 72/042; H04W 72/1263; H04W 72/121; H04W 72/0466; H04W 72/20; H04W 24/08; H04W 48/16; H04W 48/12; H04W 92/10; H04W 74/0866; H04W 74/0833; H04W 74/0006; H04L 5/0094; H04L 5/00; H04L 5/0048; H04L 5/0051; H04L 5/0053; H04L 5/0042; H04L 5/0098; H04L 5/001; H04L 5/0007; H04L 5/0041;
(Continued)

(56) References Cited

U.S. PATENT DOCUMENTS

2018/0279353 A1* 9/2018 Shaheen ................ H04W 72/21
2019/0104554 A1* 4/2019 Amuru .............. H04W 74/0833
(Continued)

OTHER PUBLICATIONS

Office Action issued in counterpart Indian Patent Application No. 202117038765 mailed on Feb. 22, 2023 (8 Pages).
(Continued)

*Primary Examiner* — Un C Cho
*Assistant Examiner* — Rasha K Fayed
(74) *Attorney, Agent, or Firm* — Osha Bergman Watanabe & Burton LLP (57) ABSTRACT

A user apparatus includes a reception unit configured to receive information specifying a BWP (Bandwidth part) from a base station apparatus, a control unit configured to configure the BWP by determining a parameter to be applied from a predetermined cell-common parameter and a predetermined user-apparatus-specific parameter that are included in the information specifying the BWP, and a communication unit configured to communicate with the base station apparatus by using the configured BWP, wherein the predetermined parameters are information items indicating a lowest usable subcarrier of the BWP.

4 Claims, 9 Drawing Sheets

(58) Field of Classification Search
CPC ... H04L 1/1864; H04L 1/0003; H04L 1/0031; H04L 1/1819; H04L 1/1822; H04L 1/1854; H04L 1/1896; H04L 27/2602; H04L 27/26025; H04B 7/0617
See application file for complete search history.

(56) References Cited

U.S. PATENT DOCUMENTS

| | | | | |
|---|---|---|---|---|
| 2019/0182870 | A1* | 6/2019 | Shih | H04W 16/32 |
| 2019/0349149 | A1* | 11/2019 | Nam | H04L 5/0053 |
| 2020/0163031 | A1* | 5/2020 | Loehr | H04W 72/23 |
| 2020/0221308 | A1* | 7/2020 | Liao | H04W 74/0833 |
| 2020/0389922 | A1* | 12/2020 | Xu | H04L 5/0053 |
| 2021/0033736 | A1* | 2/2021 | Futami | G01S 19/32 |
| 2021/0058947 | A1* | 2/2021 | Lin | H04W 72/1268 |
| 2021/0119745 | A1* | 4/2021 | Li | H04L 5/0042 |
| 2021/0250986 | A1* | 8/2021 | Luo | H04W 74/085 |
| 2021/0274562 | A1* | 9/2021 | Takeda | H04W 74/002 |
| 2021/0289536 | A1* | 9/2021 | Liu | H04W 74/0841 |
| 2021/0329669 | A1* | 10/2021 | Gao | H04W 72/53 |
| 2021/0336664 | A1* | 10/2021 | Yang | H04B 7/0456 |

OTHER PUBLICATIONS

3GPP TSG-RAN WG2 Meeting #103bis; R2-1814227 "Channel Bandwidth Signalling" Qualcomm Incorporated; Chengdu, China; Oct. 8-12, 2018 (9 pages).
3GPP TSG-RAN WG4 Meeting #89; R4-1815904 "Reply LS on RAN4 design on channel bandwidth" RAN4; Spokane, USA; Nov. 12-16, 2018 (1 page).
3GPP TSG RAN WG1 Meeting #94; R1-1808200 "Maintenance for UL power control" ZTE; Gothenburg, Sweden; Aug. 20-24, 2018 (7 pages).
3GPP TS 38.300 V15.4.0 "3rd Generation Partnership Project; Technical Specification Group Radio Access Network; NR; NR and NG-RAN Overall Description; Stage 2 (Release 15)" Dec. 2018 (97 pages).
3GPP TS 38.213 V15.4.0 "3rd Generation Partnership Project; Technical Specification Group Radio Access Network; NR; Physical layer procedures for control (Release 15)" Dec. 2018 (104 pages).
International Search Report issued in International Application No. PCT/JP2019/006884, mailed Apr. 16, 2019 (5 pages).
Written Opinion issued in International Application No. PCT/JP2019/006884; Dated Apr. 16, 2019 (4 pages).
3GPP TSG RAN WG1 #96; R1-1902653 "On UE specific channel bandwidth" Sharp; Athens, Greece; Feb. 25-Mar. 1, 2019 (2 pages).
Office Action issued in Japanese Application No. 2021-501361; Dated Jul. 26, 2022 (5 pages).
Extended European Search Report issued in European Application No. 19915629.0, dated Sep. 9, 2022 (8 pages).
3GPP TSG-RAN WG2 Meeting #103bis; R2-1814967 "Corrections on BWP op1/op2" Intel Corporation, NTT DoCoMo Inc.; Chengdu, China; Oct. 8-12, 2018 (7 pages).
Office Action issued in European Application No. 19915629.0; Dated Jul. 30, 2024 (6 pages).

* cited by examiner

| ServingCellConfig field descriptions |
|---|
| *downlinkChannelBW-PerSCS-List*<br>A set of UE specific carrier configurations for different subcarrier spacings (numerologies). Defined in relation to Point A. Corresponds to L1 parameter 'offset-pointA-set' (see 38.211, clause FFS_clause). If absent, UE uses the configuration indicated in scs-SpecificCarrierList in *DownlinkConfigCommon / DownlinkConfigCommonSIB*. The UE ignores *offsetToCarrier* present in this list and uses *offsetToCarrier* indicated in scs-SpecificCarrierList in *DownlinkConfigCommon / DownlinkConfigCommonSIB*. |

FIG.6

| ServingCellConfig field descriptions |
| --- |
| *downlinkChannelBW-PerSCS-List*<br>A set of UE specific carrier configurations for different subcarrier spacings (numerologies). Defined in relation to Point A. Corresponds to L1 parameter 'offset-pointA-set' (see 38.211, clause FFS_clause). If absent, UE uses the configuration indicated in *scs-SpecificCarrierList* in *DownlinkConfigCommon / DownlinkConfigCommonSIB*. *offsetToCarrier* present in this list is not applicable. *offsetToCarrier* indicated in *scs-SpecificCarrierList* in *DownlinkConfigCommon / DownlinkConfigCommonSIB* is applicable. |

FIG.7

| ServingCellConfig field descriptions |
|---|
| downlinkChannelBW-PerSCS-List<br>A set of UE specific carrier configurations for different subcarrier spacings (numerologies). Defined in relation to Point A. Corresponds to L1 parameter 'offset-pointA-set' (see 38.211, clause FFS_clause). If absent, UE uses the configuration indicated in scs-SpecificCarrierList in DownlinkConfigCommon / DownlinkConfigCommonSIB. The value of offsetToCarrier present in this list shall be the same as in scs-SpecificCarrierList in DownlinkConfigCommon / DownlinkConfigCommonSIB. |

FIG.10

USER APPARATUS AND BASE STATION APPARATUS

FIELD OF THE INVENTION

The present invention relates to a user apparatus and a base station apparatus in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

NR uses a method in which a part of the carrier bandwidth is used by a user device as a BWP (Bandwidth part). BWP consists of contiguous PRBs (Physical Resource Blocks). Further, up to four BWPs can be configured for a user apparatus in DL and UL, respectively. When a plurality of BWPs are configured, the user device performs communication using one active BWP (e.g., Non-Patent Document 2).

CITATION LIST

Non-Patent Document

[Non-Patent Document 1] 3GPP TS 38.300 V15.4.0 (2018-12)
[Non-Patent Document 2] 3GPP TS 38.213 V15.4.0 (2018-12)

SUMMARY OF THE INVENTION

Technical Problem

In an NR wireless communication system, a user apparatus can perform BWP configuration based on a cell-common parameter or a user-apparatus-specific parameter. However, a parameter specifying a frequency domain is duplicated in cell-common parameters and in user-specific parameters, and thus, there is a case in which an operation for specifying BHP is not identified.

The present invention has been made in view of the above points, and it is an object of the present invention to appropriately configure communications to which BWP is applied.

Solution to Problem

According to the disclosed technique, provided is a user apparatus including a reception unit configured to receive information specifying a BWP (Bandwidth part) from a base station apparatus, a control unit configured to configure the BHP by determining a parameter to be applied from a predetermined cell-common parameter and a predetermined user-apparatus-specific parameter that are included in the information specifying the BHP, and a communication unit configured to communicate with the base station apparatus by using the configured BWP, wherein the predetermined parameters are information items indicating a lowest usable subcarrier of the BHP.

Advantageous Effects of Invention

According to an embodiment of the present invention, it is possible to appropriately configure communications to which BHP is applied.

DETAILED DESCRIPTION OF THE PREFERRED EMBODIMENTS

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in one or more embodiments described below, terms that are used in the existing LTE are used, such, as SS (Synchronization Signal), PSS (Primary SS), SSS (Secondary SS), PBCH (Physical broadcast channel), PRACH (Physical random access channel), etc. The above-described terms are used for the sake of description convenience. Signals, functions, etc., which are similar to the above-described terms, may be referred to as different names. Further, terms, which are used in MR and correspond to the above-described terms, are NR-SS, MR-PSS, MR-SSS, NR- PBCH, NR-PRACH, etc. However, even when a signal is used for NR, there may be a case in which the signal is not referred to as "NR-".

Furthermore, in an embodiment of the present invention, the duplex method may be TDD (Time Division Duplex), FDD (Frequency Division Duplex), or other methods (e.g., Flexible Duplex), or the like).

Further, in an embodiment of the present invention, the expression, radio (wireless) parameters are "configured" may mean that a predetermined value is pre-configured, or may mean that a radio parameter indicated by the base station apparatus 10 or the user apparatus 20 is configured.

Figure 1:
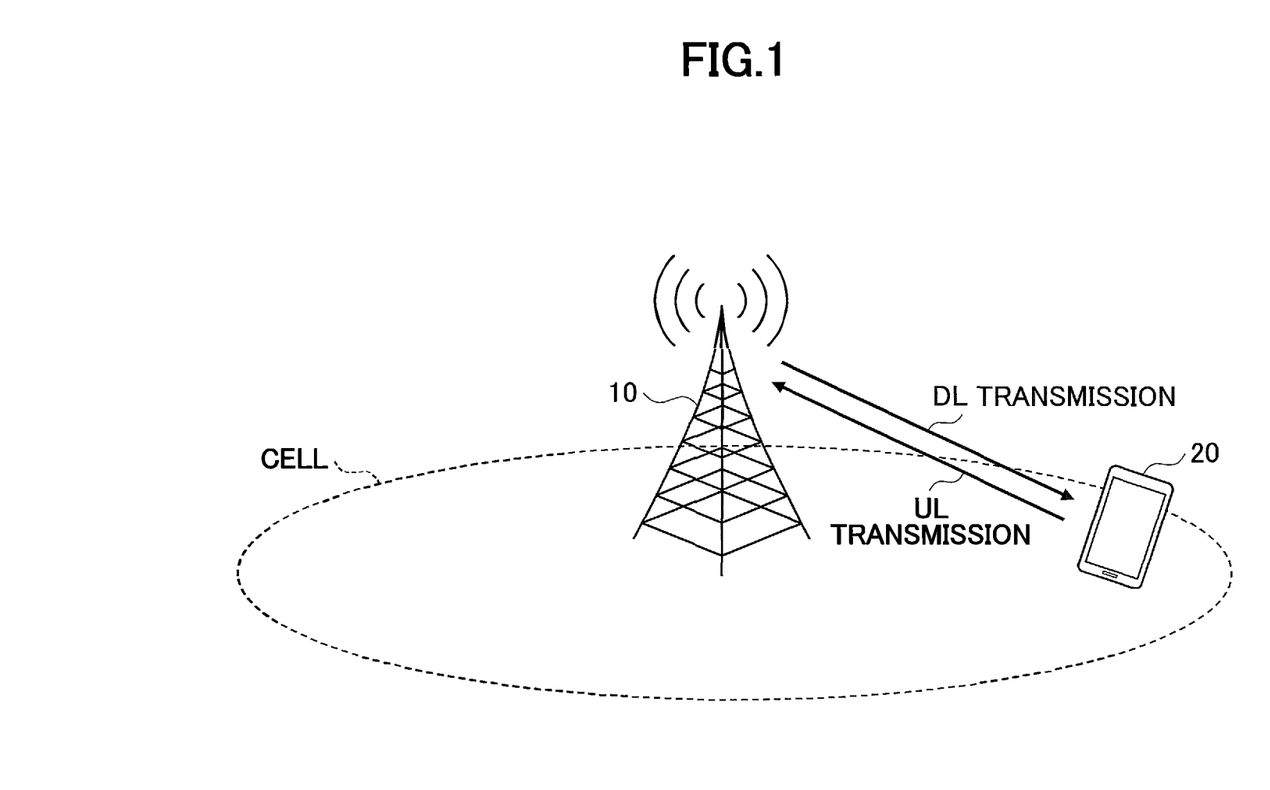
FIG. 1 is a drawing illustrating a wireless communication system according to an embodiment of she present invention.

FIG. 1 is a drawing Illustrating a wireless communication system according to an embodiment of she present invention. As Illustrated in FIG. 1, the wireless communication system includes a base station apparatus 10 and a user apparatus 20. In FIG. 1, a single base station apparatus 10 and a single user apparatus 20 are illustrated as examples. There may be a plurality of the base station apparatuses 100 and a plurality or the user apparatuses 200.

The base station apparatus 10 is a communication apparatus that provides one or more cells and performs wireless communications with the user apparatus 20. Physical resources of the radio signal may be defined in the time domain and the frequency domain, the time domain may be defined by the number of OFDM symbols, and the frequency domain may be defined by the number of sub-carriers or resource blocks. The base station apparatus 10 transmits a synchronization signal and system information to the user apparatus 20. The synchronization signal is, for example, an NR-PSS and an NR-SSS. The system information is transmitted via, for example, a NR-PBCH, and may be referred to as broadcast information. As shown in FIG. 1, the base station apparatus 10 transmits a control signal or data in DL (Downlink) to the user apparatus 20 and receives a control signal or data in UL (Uplink) from the user apparatus 20. The base station apparatus 10 and the user apparatus 20 are capable of transmitting and receiving a signal by performing the beamforming. Further, both the base station apparatus 10 and the user apparatus 20 can apply MIMO (Multiple Input Multiple Output) communication to the DL or UL. Further, both the base station apparatus 10 and the user apparatus 20 may perform communications via an SCell (Secondary Cell) and PCell (Primary Cell) using CA (Carrier Aggregation).

The user apparatus 20 may be a communication apparatus that includes a wireless communication function such as a smart-phone, a mobile phone, a tablet, a wearable terminal, or a communication module for MIN (Machine-to-Machine). As shown in FIG. 1, the user apparatus 20 uses various communication services provided by the wireless communication system by receiving control signals or data in DL from the base station apparatus 10 and transmitting control signals or data in UL to the base station apparatus 10.

Figure 2:
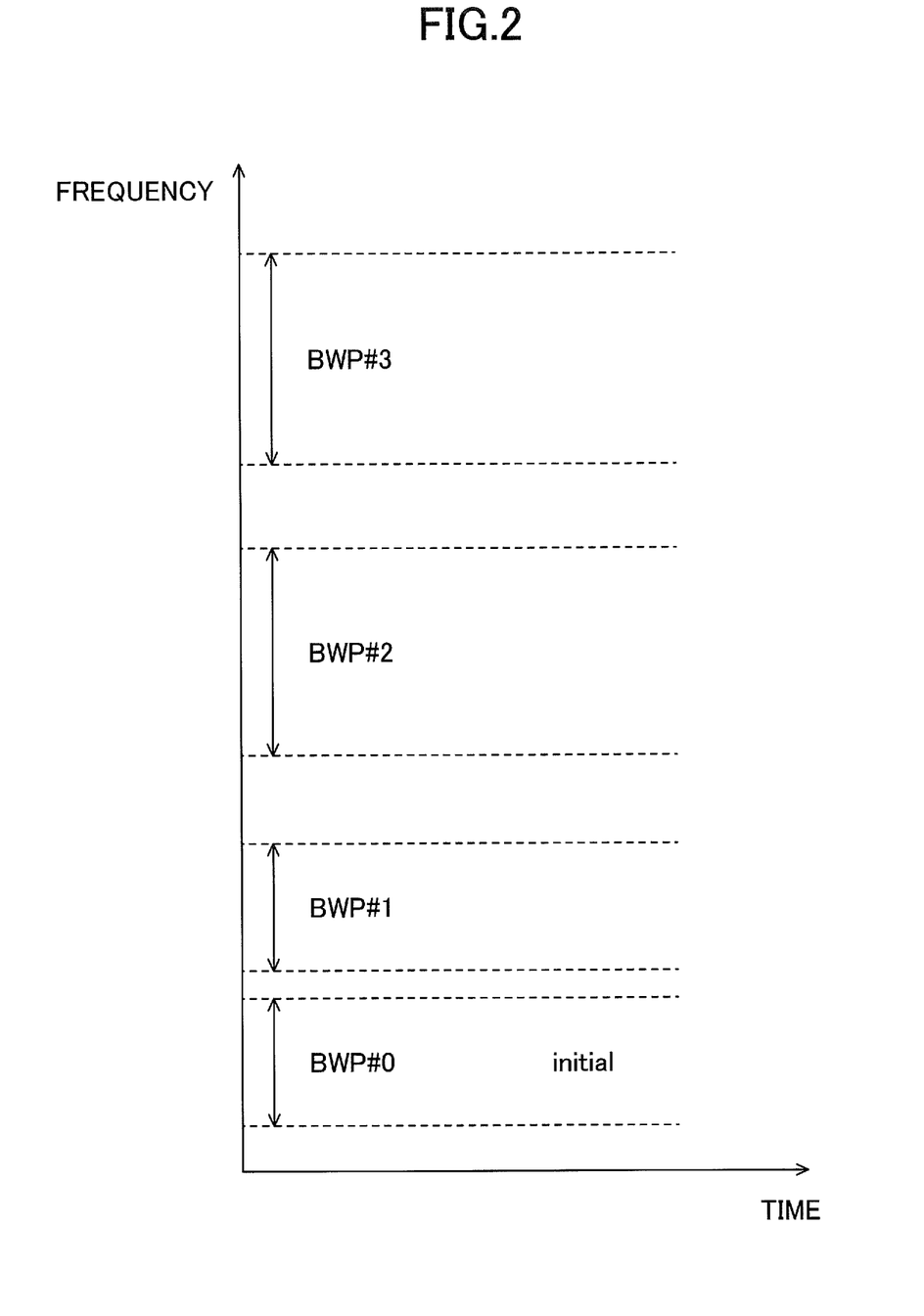
FIG. 2 is a drawing illustrating a BWP.

FIG. 2 is a drawing illustrating a BWP. FIG. 2 is an example i. which four BWTs (Bandwidth parts), BWP#0, BWP#1, BWP#2, and BWP#3 are configured. The four BWPs shown in FIG. 2 may be configured for DL or UL. The four BWPs shown in FIG. 2 are arranged in the carrier bandwidth of a cell. BWP#0 is an BWP. The initial BWP may be specified from higher layers, or specified as a part of a control resource set of Type 0 PDCCH (Physical Downlink Control Channel) common search space, and used when establishing connections. The BWP that is used is an active BWP. When multiple BWPs are configured, only one of the BWPs is an active SUP. The BWP that is used when an inactive timer for BWP expires is a default BWP. In the case where the default BWP is not specified by an upper layer, the initial BWP is used as the default BWT. It should be noted that, in the following descriptions, the initial BWP may be an initial DL SUP or an initial UL BWP. Similarly, in the following descriptions, the default BWP may be a default DL BWP or a default UL BWP. Similarly, in the following descriptions, the active BWP may be an active DL BWP or an active UL BWP.

Figure 3:
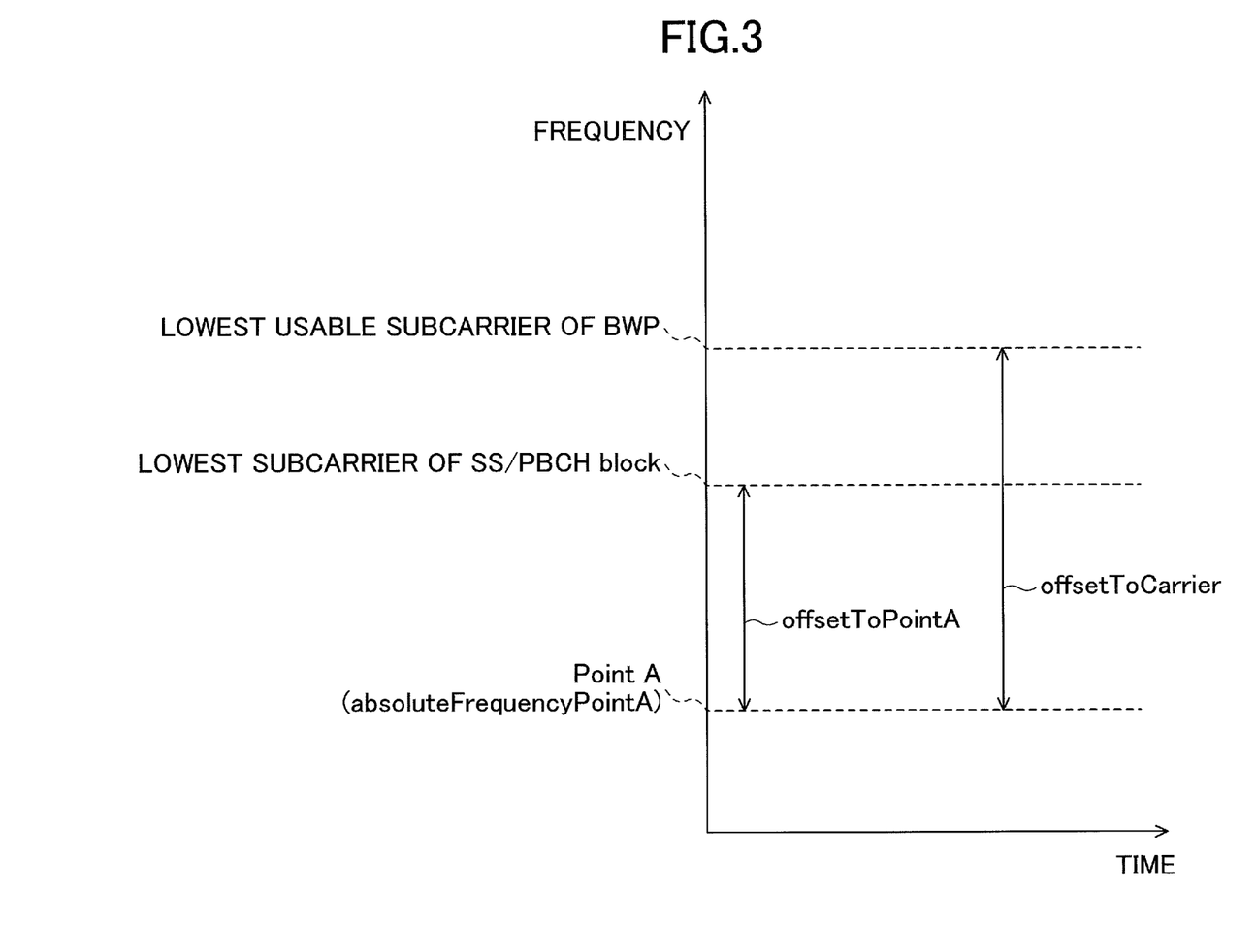
FIG. 3 is a drawing illustrating an operation for configuring BWP.

FIG. 3 is a drawing illustrating an operation for configuring BWP. As shown in FIG. 3, in the frequency domain, a reference point, "Point A", that is an origin of an offset is defined. "Point A" can be configured, for example, in an information element "absoluteFrequencyPointA".

A lowest subcarrier of SS/PBCH block (Synchronization Signal/Physical Broadcast Channel block) is configured by an information element "offsetToPointA" indicating an offset from "Point A". In addition, a lowest usable subcarrier of BWP is configured by an information element "offsetToCarrier" indicating an offset from "Point A".

Figure 4:
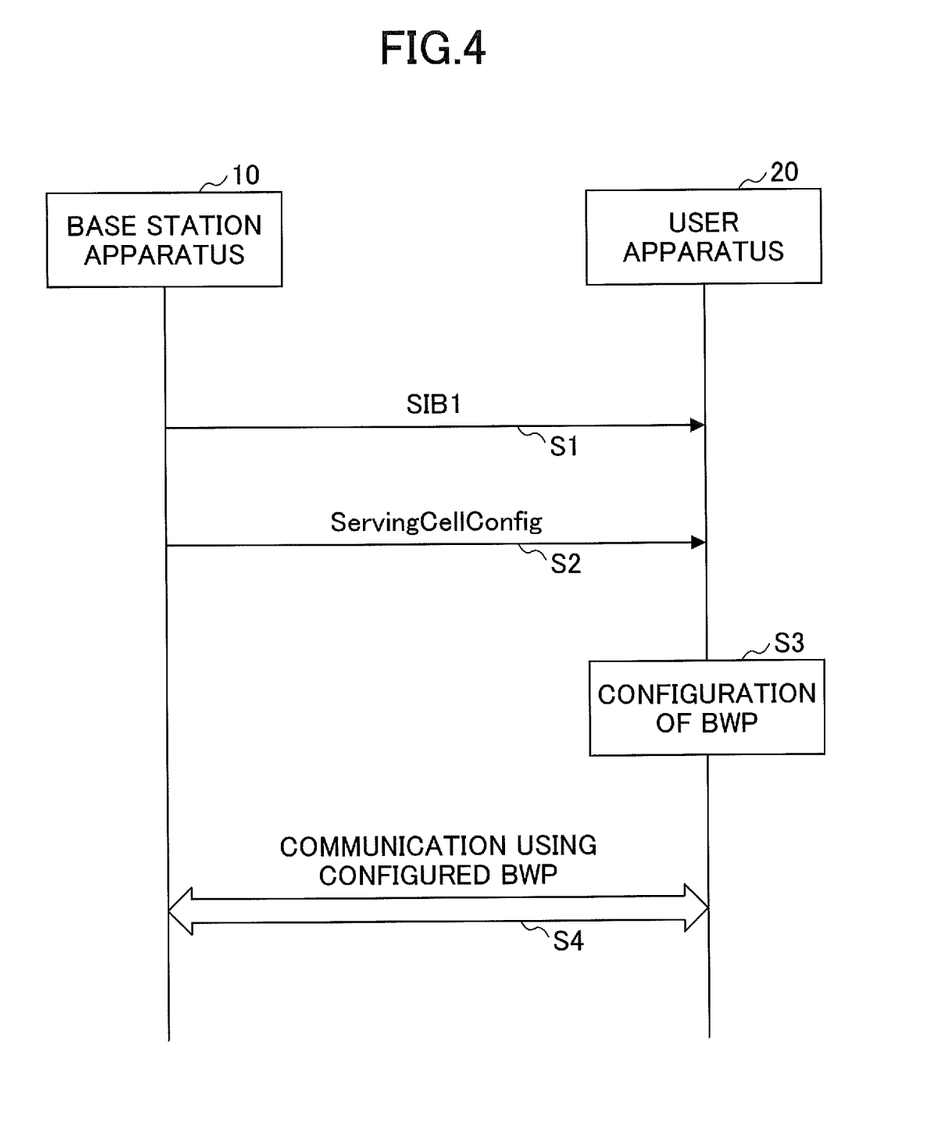
FIG. 4 is a sequence diagram illustrating an operation example in an embodiment of the present invention.

FIG. 4 is a sequence diagram illustrating an operation example in an embodiment of the present invention. An operation example in which a user apparatus 20 configures BWP and performs communication will be described with reference to FIG. 4.

In step S1, a base station apparatus 10 transmits "SIB1", which is system information commonly applied to a cell, to a user apparatus 20. The user apparatus 20 configures parameters commonly applied to a cell according to the "SIB1". "SIB1" includes an information element "SCS-SpecificCarrier". "SCS-SpecificCarrier" includes "offsetToCarrier" and the user apparatus 20 can configure a lowest usable subcarrier of BWP.

Subsequently, in step S2, the base station. apparatus 10 transmits an information element "ServingCellConfig" specifically applied to UE (User Equipment) to the user apparatus 20. For example, "ServingCellConfig" may be received by the user apparatus 20 via an RRC reconfiguration message. The user apparatus 20 configures the parameters that are specifically applied to UE according to "ServingCellConfig". "ServingcellConfig" includes an information element "downlinkChannelBW-PerSCS-List". "downlinkChannelBW-PerSCS-List" is an information element that contains US-specific carrier configurations for respective Numerologies. "downlinkChannelBW-PerSCS-List" includes an information element "?CS-SpecificCarrier". "SCS-SpecificCarrier" includes "offsetToCarrier" and the user apparatus 20 can configure a lowest usable subcarrier of BWP.

Subsequently, in step 53, the user apparatus 20 configures SWP based on the parameters received from the base station apparatus 10. Here, because the information element "offsetToCarrier" is included in both the cell-common "SIB1" and the UE-specific "ServingCellConfig", it is unclear for the user apparatus 20 which "offsetToCarrier" should be used when configuring BWP.

With respect to the above, for example, in a case where "offsetToCarrier" is included in "downlinkChannelSW-Per-SCS-List", the user apparatus 20 ignores "offsetToCarrier" included in "downlinkChannelBW-PerSCS-List", and uses "offsetToCarrier" included in "DownlinkConfigCommon" or "DownlinkConfigCommonSIB". "DownlinkConfigCommon" or "DownlinkConfigCommonSIB" is information elements that configures cell-common parameters. "DownlinkConfigCommonSIB" is included in "SIB1".

Further, for example, in a case where "offsetToCarrier" is included in "downinkChannelBW-PerSCS-List", the "offsetToCarrier" included in "downlinkChannelSW-PerSCS-List" need not be applied "offsetToCarrier" indicated by "scs-SpecificCarrierList" included in the information element "DownlinkConfigCommon" or "DownlinkConfigCommonSIB" may be applicable.

In addition, for example, in a case where "offsetToCarrier" is included in "downlinkChannelBW-PerSCS-List", a same value may be configured to "offsetToCarrier" included in "downlinkChannelBW-PerSCS-List" as in "offsetToCarrier" indicated by "scs-SpecificCarrierList" included in the information element "DownlinkConfigCommon" or "DownlinkConfigCommonSIB".

Figure 5:
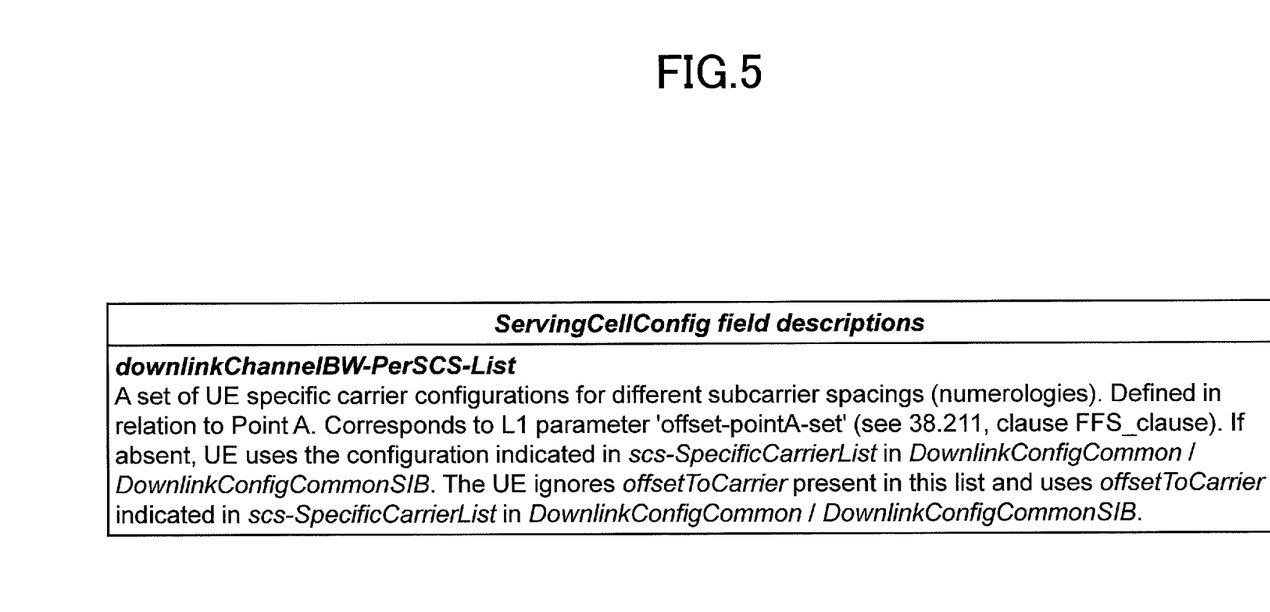
FIG. 5 is a specification change example (1) related to an operation example in an embodiment of the present invention.

FIG. 5 is a specification change example (1) related to an operation example in an embodiment of the present invention. As illustrated FIG. 5, in a case where "offsetToCarrier" is included in "downlinkChannelBW-PerSCS-List", the user apparatus 20 ignores "offsetToCarrier" included in "downlinkChannelBW-PerSCS-List", and uses "offsetToCarrier" included in the information element "DownlinkConfigCommon" or "DownlinkConfigCommonSIB".

Figure 6:
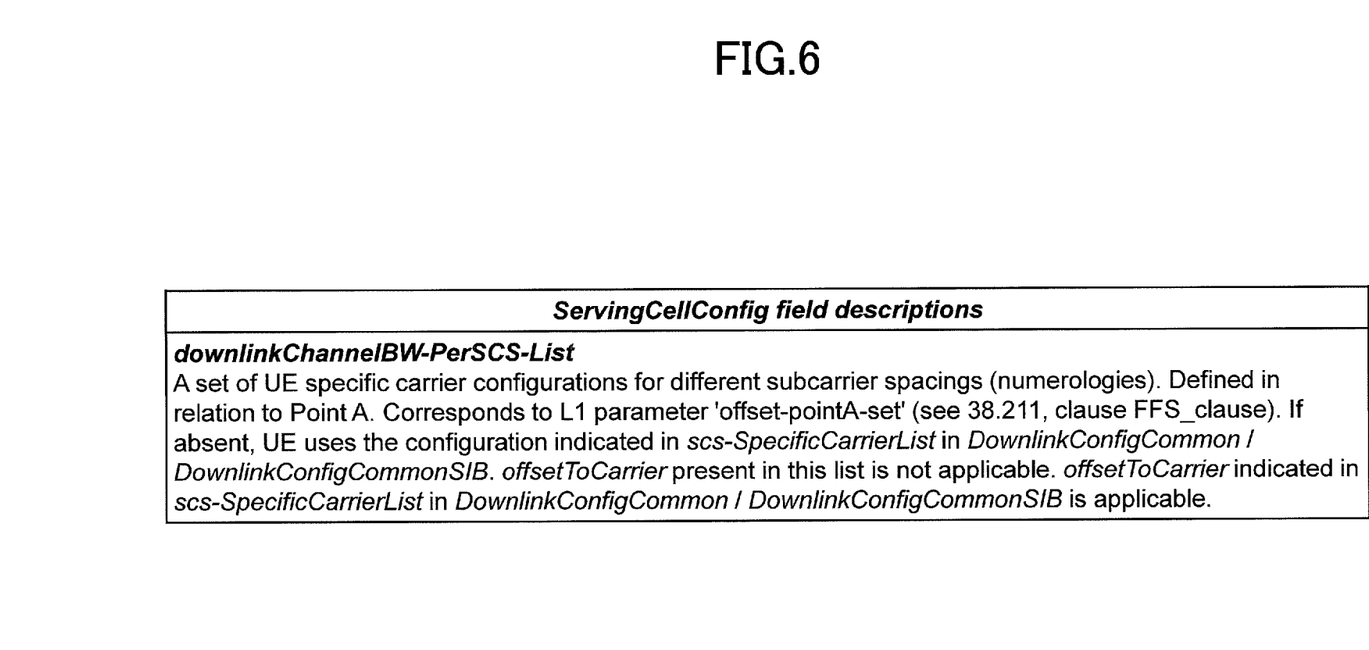
FIG. 6 is a specification change example (2) related to an operation example in an embodiment of the present invention.

FIG. 6 is a specification change example (2) related to an operation example in an embodiment of the present invention. As illustrated in FIG. 6, in a case where "offsetToCarrier" is included in "downlinkChannelBW-PerSCS-List", "offsetToCarrier" included in "downlinkChannelBW-PerCS-List" need not be applied. "offsetToCarrier" indicated by "scs-SpecificCarrierList" included in the information element "DownlinkConfigCommon" or "DownlinkConfigCommonSIB" may be applicable.

Figure 7:
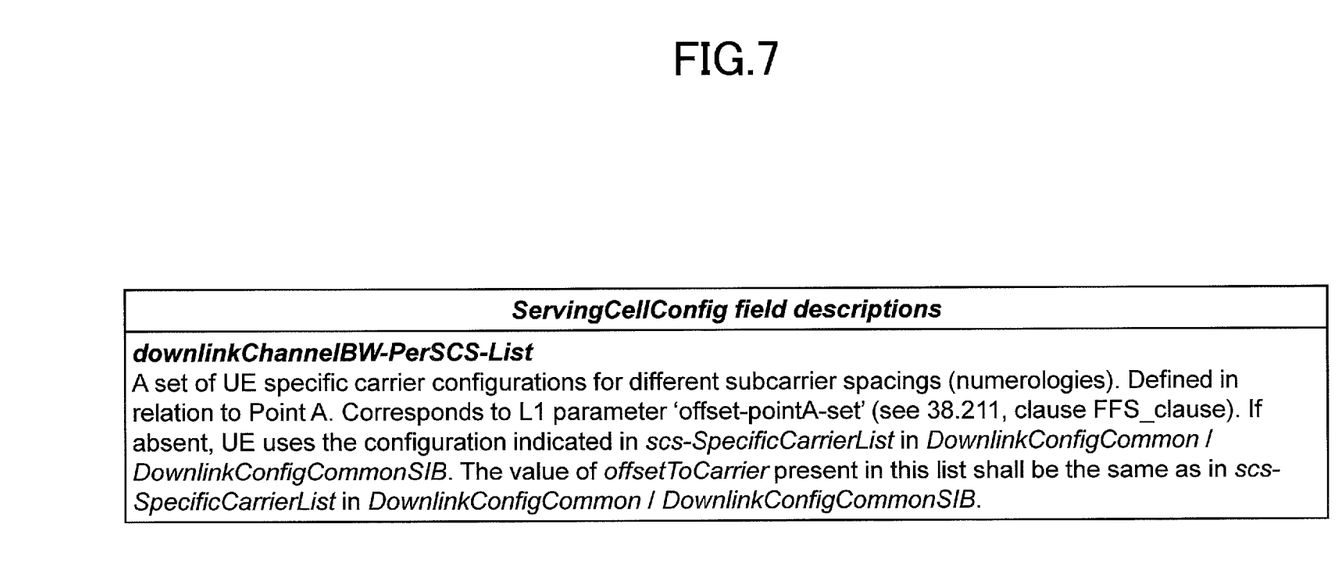
FIG. 7 is a specification change example (3) related to an operation example in an embodiment of the present invention.

FIG. 7 is a specification change example (3) related to an operation example in an embodiment of the present invention. As illustrated in FIG. 7, in a case where "offsetToCarrier" is included in "downlinkChannelBW-PerSCS-List" a same value may be configured to "offsetToCarrier" included in "downlinkChannelBW-PerSCS-List" as in "offsetToCarrier" indicated by "scs-SpecificCarrierList" included in the information element "DownlinkConfigCommon" or "DownlinkConfigCommonSIB".

Referring back to FIG. 4. In step S4, the user apparatus 20 performs communication using the configured BWP with the base station apparatus 10.

According to the above-described embodiment, the user apparatus 20 can appropriately select cell-commonly configured parameters or UE-specifically configured parameters to configure BWP and communicate with the base station apparatus 10.

In other words, is possible to appropriately configure communications to which BWP is applied.

Apparatus Configuration

Next, examples of functional structures of the base station apparatus 10 and the user apparatus 20 that perform the processes and operations described above will be described. The base station apparatus 10 and the user apparatus 20 each have functions for performing an embodiment of the present invention. It should be noted that, the base station apparatus 10 and the user apparatus 20 each may have only a part of the functions for performing an embodiment of the present invention.

Base Station Apparatus 10

Figure 8:
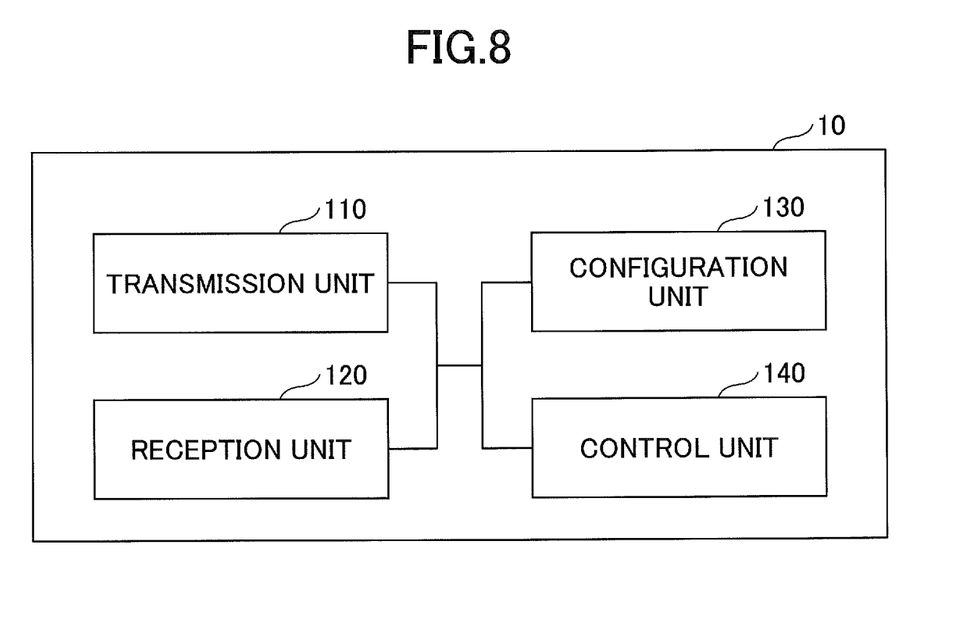
FIG. 8 is a drawing illustrating an example of a functional structure of a base station apparatus according to an embodiment of the present invention.

FIG. 8 is a drawing illustrating an example of a functional structure of a base station apparatus 10. As illustrated in FIG. 8, the base station apparatus 10 includes a transmission unit 110, a reception unit 120, a configuration unit (setting unit) 130, and a control unit 140. The functional structure illustrated in FIG. 8 is merely an example. Functional divisions and names of functional units may be anything as long as operations can be performed according to an embodiment of the present invention.

The transmission unit 110 has a function for generating a signal to be transmitted to the user apparatus 20 and for transmitting the signal wirelessly. The reception unit 120 has a function for receiving various signals transmitted from the user apparatus 20 and for obtaining, for example, upper layer information from the received signals. Further, the transmission unit 110 has a function for transmitting to the user apparatus 20 NR-PSS, NR-SSS, NB-PBCH, DL/UL control signals, etc.

The configuration unit 130 stores, in a storage device, pre-configured configuration information and various configuration information items to be transmitted to the user apparatus 20, and reads them from the storage device as necessary. The contents of the configuration information are, for example, the communication configuration related to cells of the user apparatus 20, the communication configuration related to BWPs, or the like.

As described in an embodiment of the present invention, the control unit 140 performs a process related to communication configuration related to cells or BWPs of the user apparatus 20. The functional units related to signal transmission in the control unit 140 may be included in the transmission unit 110, and the functional units related to signal reception in the control unit 140 may be included in the reception unit 120.

User Apparatus 20

Figure 9:
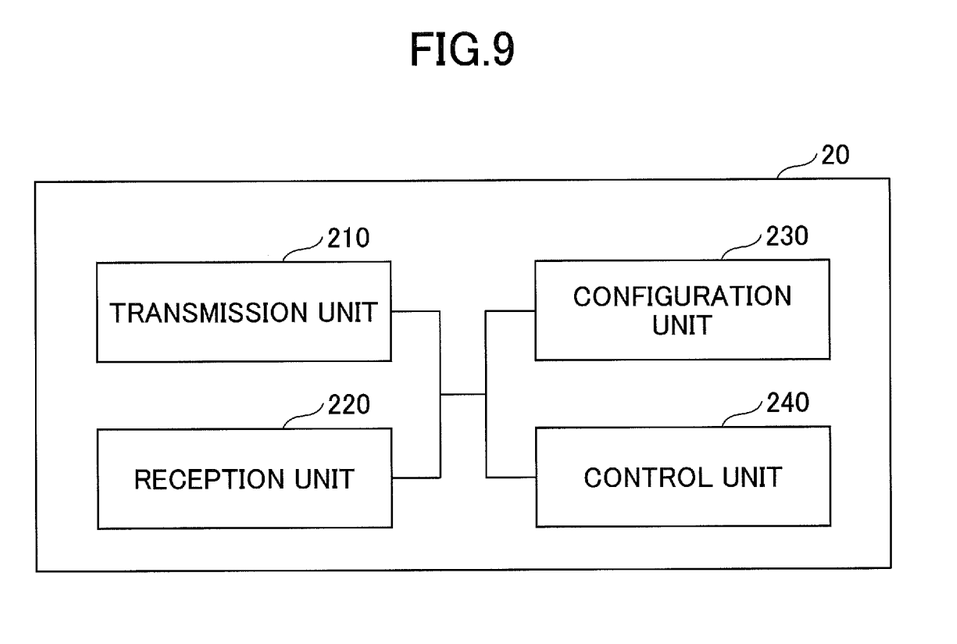
FIG. 9 is a drawing illustrating an example of a functional structure of a user apparatus 20 according to an embodiment of the present invention.

FIG. 9 is a drawing illustrating an example of a functional structure of a user apparatus 20. As illustrated in FIG. 9, the user apparatus 20 includes a transmission unit 210, a reception unit 220, a configuration unit (setting unit) 230, and a control unit 240. The functional structure illustrated in FIG. 9 is merely an example. Functional divisions and names of functional units may be anything as long as operations can be performed according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station apparatus 10. Further, for example, with respect to the D2D communications, the transmission unit transmits, to another user apparatus 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 120 receives, from the another user apparatus 20, PSCCH, PSSCH, PSDCH, or PSBCH.

The configuration unit 230 stores, in a storage device, various configuration information items received from the base station apparatus 10 or the user apparatus 20 via the reception unit 220, and reads them from the storage device if necessary. Further, the configuration (setting) unit 230 also stores preset configuration (setting) information. The contents of the configuration information are, for example, communication configuration related to cells, communication configuration related to BWPs, or the like.

As described in an embodiment of the present invention, the control unit 240 controls communications to which BWP is applied, based on the communication configuration obtained from the base station apparatus 10. The functional units related to signal transmission in. the control unit 240 may be included in the transmission unit 210, and the functional units related to signal reception in the control unit 240 may be included in the reception unit 220.

Hardware Structure

In the above functional structure diagrams used for describing an embodiment of the present invention (FIG. 8 and FIG. 9), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses, that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, configuring, allocating, mapping, and assigning, etc. For example, a functional block (component) that functions to transmit is called a transmitting unit or a transmitter. In either case, as described above, the implementation method is not particularly limited.

Figure 10:
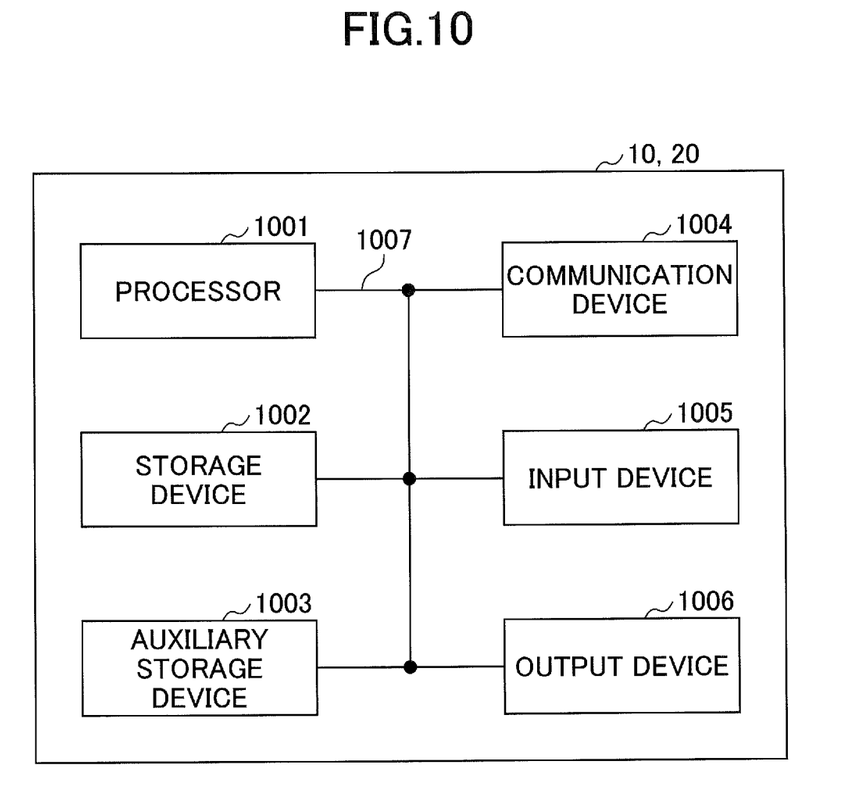
FIG. 10 is a drawing illustrating examples of hardware structures of a base station apparatus 10 or a user apparatus 20 according to an embodiment of the present invention.

For example, the base station apparatus 10, the user apparatus 20, or the like according to an embodiment of the present invention may function as a computer for processing the radio communication method illustrated by an embodiment of the present invention. FIG. 10 is a drawing illustrating an example of hardware structures of a base station apparatus 10 and a user apparatus 20 according to an embodiment of the present invention. Each of the base station apparatus 10 and the user apparatus 20 may be physically a computer apparatus including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station apparatus 10 and the user apparatus 20 may include one or more of each of the apparatuses illustrated in the figure, or may not include some apparatuses.

Each function in the base station apparatus 10 and the user apparatus 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage device 1003 and/or the communication device 1004, and performs various processes according to the program, the software module, or tire data. As the program, a program is used that causes the computer to perform at least a part of operations according to an embodiment of the present invention described above. For example, the control unit 140 of the base station apparatus 10 illustrated in FIG. 8 may be realized by control programs that are stored in the storage device 1002 and are executed by the processor 1001. Further, for example, the control unit 240 of the user apparatus 20 illustrated in FIG. 9 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station apparatus 10 and the user apparatus 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, provided is a user apparatus including a reception unit configured to receive information specifying a BWP (Bandwidth part) from a base station apparatus, a control unit configured to configure the BWP by determining a parameter to be applied from a predetermined cell-common parameter and a predetermined user-apparatus-specific parameter that are included in the information specifying the BWP, and a communication unit configured to communicate with the base station apparatus by using the configured BWP, wherein the predetermined parameters are information items indicating a lowest usable subcarrier of the BWP.

According to the above configuration, the user apparatus 20 can appropriately select cell-commonly configured parameters or UE-specifically configured parameters to configure BWP and communicate with the base station apparatus 10. In other words, is possible to appropriately configure communications to which BWP is applied.

In a case where the information specifying the BWP includes the predetermined user-apparatus-specific parameter, the control unit may ignore the predetermined user-apparatus-specific parameter, and determine to apply the predetermined cell-common parameter included in the information specifying the BWP to configuration of the BWP. According to the above configuration, the user apparatus 20 can appropriately select cell-commonly configured parameters or UE-specifically configured parameters to configure BWP and communicate with the base station apparatus 10.

The control unit may determine not to apply the predetermined user-apparatus-specific parameter included in the information specifying the BWP, and to apply the predetermined cell-common parameter included in the information specifying the BWP, to configuration of the BWP. According to the above configuration, the user apparatus 20 can appropriately select cell-commonly configured parameters or UE-specifically configured parameters to configure BWP and communicate with the base station apparatus 10.

The predetermined user-apparatus-specific parameter included in the information specifying the BWP and the predetermined cell-common parameter included in the information specifying the BWP have a same value. According to the above configuration, the user apparatus 20 can apply either cell-commonly configured parameters or UE-specifically configured parameters to configure BWP and communicate with the base station apparatus 10.

Further, according to an embodiment of she present invention, provided is a base station apparatus including a transmission unit configured to transmit information specifying a BWP (Bandwidth part), a control unit configured to configure the BWP by determining a parameter to be applied from a predetermined cell-common parameter and a predetermined user-apparatus-specific parameter that are included in the information specifying the BWP, and a communication unit configured to communicate with the user apparatus by using the configured BWP, wherein the predetermined parameter is information indicating a lowest usable subcarrier of the BWP.

According to the above configuration, the user apparatus 20 can appropriately select cell-commonly configured parameters or US-specifically configured parameters to configure BWP and communicate with the base station apparatus 10. In other words, it is possible to appropriately configure communications to which BWP is applied.

Supplement of Embodiment

As described above, one or more embodiments have been described. The present invention is not limited to the above embodiments. A person skilled in the art should understand that there are various modifications, variations, alternatives, replacements, etc., or the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a base station apparatus 10 and a user apparatus 20 have been described by using functional block diagrams. However, the apparatuses may be realized by hardware, software, or a combination of hardware and software. The software executed by a processor included in a base station apparatus 10 according to an embodiment of the present invention and the software executed by a processor included in a user apparatus 20 according to an embodiment of the present invention may be stored in a random access memory (RAM), a flash memory, a read only memory (ROM), an EPROM, an EEPROM, a register, a hard disk (HUD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master information Block), SIB (System Information Block))), other signals, or combinations thereof. Further, RRC signaling may be referred to as an RRC message. The RRC signaling may be, for example, an RRC, connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also he applied combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 10 in the present specification, may he performed by an upper node in some cases. In a network including one or more network nodes including a base station apparatus 10, it is apparent that various operations performed for communicating with a user apparatus 20 may be performed by the base station apparatus 10 and/or another network node other than the base station apparatus 10 (for example, but not limited to, MME or S-GW). According to the above, a case is described in which there is a single network node other than the base station apparatus 10. However, a combination of multiple other network nodes may be considered (e.g., MME and S-GN).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one wired line technologies (such as coaxial cable, fiber optic cable, twisted pair, digital subscriber line (DSL) and wireless technologies (infrared, microwave, etc at least one of these wired line technologies and wireless technologies is included within the definition of the transmission medium.

Information signal, or the like, described in the present specification may represented by using any one of various different technologies. For example, data, an instruction, a command, information, a signal, a bit, a symbol, chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple user apparatuses 20 (e.g., may be referred to as D2D (Device-to-Device), V2X (Vehicle-to-Everything), etc.). In this case, the function of the base station apparatus 10 described above may be provided by the user apparatus 20. Further, the phrases up "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures) , or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or store wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present. specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SM, bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes mar be referred to as a TTI, and one slot or one mini slot mar be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the ITT may be referred to as a slot, a mini slot, or the like, rather than a subframe.

The TTI refers to, for example, the minimum time unit for scheduling in wireless communications. For example, in an LTE system, a base station schedules each user apparatus 20 to allocate radio resources (such as frequency bandwidth, transmission power, etc. that can be used in each user apparatus 20) in TTI units. The definition of TTI is not limited to the above.

The TTII may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the trans port block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for um (UL BWP) and BWP for DL (DL BWP). For a UE, one or more BWPs may be configured in one carrier.

At least one of the configured BWPs may be activated, and the UE may assume that the UE will not transmit and receive signals/channels outside the activated REP. It should be noted that the terms "cell" and "carrier" in this disclosure may be replaced by "EEP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTT, the symbol length, the cyclic prefix (CP) length, and the like, may changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term. "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined Information (e.g., notification (transmission/reporting) of "X" not limited to an explicit notification (transmission/reporting), and may be performed by an implicit notification (transmission/reporting) (e.g., by not performing notification. (transmission/reporting) of the predetermined information).

Note that, in the present disclosure, the transmission unit 210 and the reception unit 220 are examples of the communication unit. The transmission unit 110 and the reception unit 120 are examples of communication units. SIB1 or ServingCellConfig is an example of the information specifying BWP. "offsetToCarrier" is an example or a predetermined parameter.

As described above, the present invention has been described in detail. It is apparent to a person skilled in the art that the present invention is not limited to one or more embodiments of the present invention described in the present specification, Modifications, alternatives, replacements, etc., of the present invention may be possible without departing from the subject matter and the scope of the present invention defined by the descriptions of claims. Therefore, the descriptions of the present specification are for Illustrative purposes only, and are not intended to be limitations to the present invention.

DESCRIPTION OF THE REFERENCE NUMERALS

10 Base station apparatus
110 Transmission unit
120 Reception unit
130 Configuration unit
140 Control unit
20 User apparatus
210 Transmission unit
220 Reception unit
230 Configuration unit
240 Control coif
1001 Processor
1002 Storage device
1003 Auxiliary storage device
1004 Communication device
1005 Input device
1006 Output device

The invention claimed is:

1. A terminal comprising:
a receiver configured to receive, from a base station:
   first configuration information specifically applied to the terminal and that includes a first information element configuring a lowest subcarrier; and
   second configuration information configuring cell-common parameters and that includes a second information element configuring a lowest subcarrier;
a processor configured to configure a Bandwidth part (BWP) using the second information element and not using the first information element; and
a transmitter configured to communicate with the base station using the configured BWP,
wherein the first information element is included in an information element including a terminal-specific carrier configuration per subcarrier spacing, and indicates a usable lowest subcarrier, and wherein the second information element is included in an information element configuring a cell-common parameter, and indicates a usable lowest subcarrier.

2. A base station comprising:
a transmitter configured to transmit to a terminal:
first configuration information specifically applied to the terminal and that includes a first information element configuring a lowest subcarrier; and
second configuration information configuring cell-common parameters and that includes a second information element configuring a lowest subcarrier; and
a processor configured to configure a Bandwidth part (BWP) using the second information element and not using the first information element,
wherein the transmitter is further configured to communicate with the terminal using the configured BWP,
wherein the first information element is included in an information element including a terminal-specific carrier configuration per subcarrier spacing, and indicates a usable lowest subcarrier, and
wherein the second information element is included in an information element configuring a cell-common parameter, and indicates a usable lowest subcarrier.

3. A communication method performed by a terminal, comprising:
receiving, from a base station:
first configuration information specifically applied to the terminal and that includes a first information element configuring a lowest subcarrier; and
second configuration information configuring cell-common parameters and that includes a second information element configuring a lowest subcarrier;
configuring a Bandwidth part (BWP) using the second information element and not using the first information element; and
communicating with the base station using the configured BWP,
wherein the first information element is included in an information element including a terminal-specific carrier configuration per subcarrier spacing, and indicates a usable lowest subcarrier, and
wherein the second information element is included in an information element configuring the cell-common parameter, and indicates a usable lowest subcarrier.

4. A wireless communication system comprising a terminal and a base station, wherein
the terminal includes:
a receiver configured to receive, from a base station:
first configuration information specifically applied to the terminal and that includes a first information element configuring a lowest subcarrier; and
second configuration information configuring cell-common parameters and that includes a second information element configuring a lowest subcarrier;
a first processor configured to configure a Bandwidth part (BWP) using a second information element and not using the first information element; and
a first transmitter configured to communicate with the base station using the configured BWP, and
the base station includes:
a second transmitter configured to transmit to the terminal:
the first configuration information specifically applied to the terminal and that includes the first information element configuring the lowest subcarrier; and
the second configuration information configuring cell-common parameters and that includes the second information element configuring the lowest subcarrier; and
a second processor configured to configure the BWP using the second information element and not using the first information element,
wherein the second transmitter is further configured to communicate with the terminal using the configured BWP,
wherein the first information element is included in an information element including a terminal-specific carrier configuration per subcarrier spacing, and indicates a usable lowest subcarrier, and
wherein the second information element is included in an information element configuring the cell-common parameter, and indicates a usable lowest subcarrier.

* * * * *